Dec. 8, 1964  B. W. PEROVICH  3,159,895
PIPE LINING MACHINE
Filed Feb. 5, 1962  2 Sheets-Sheet 1
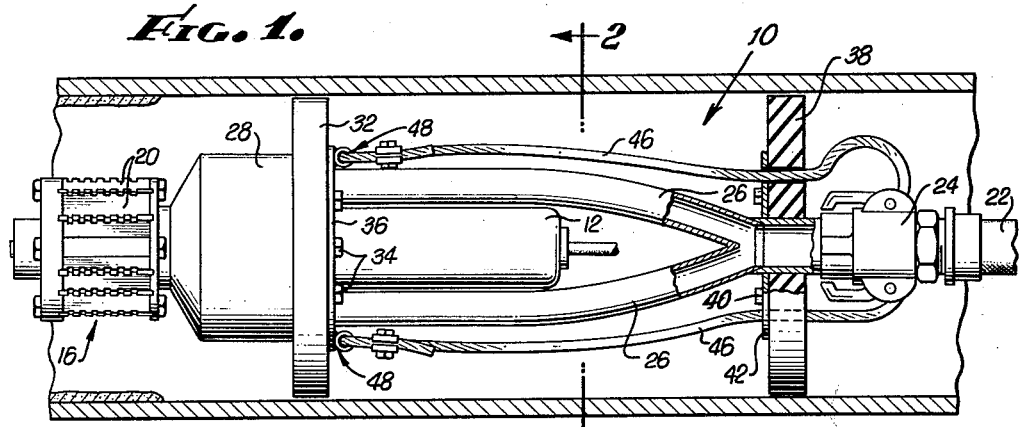
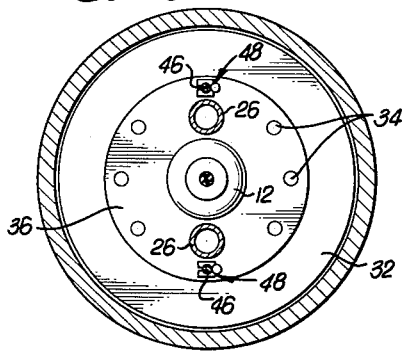
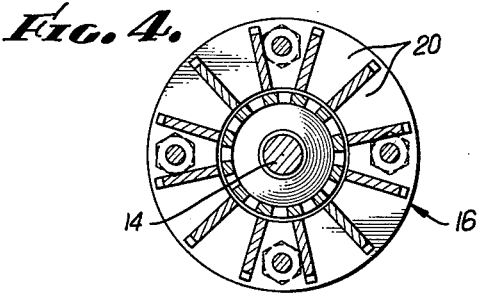
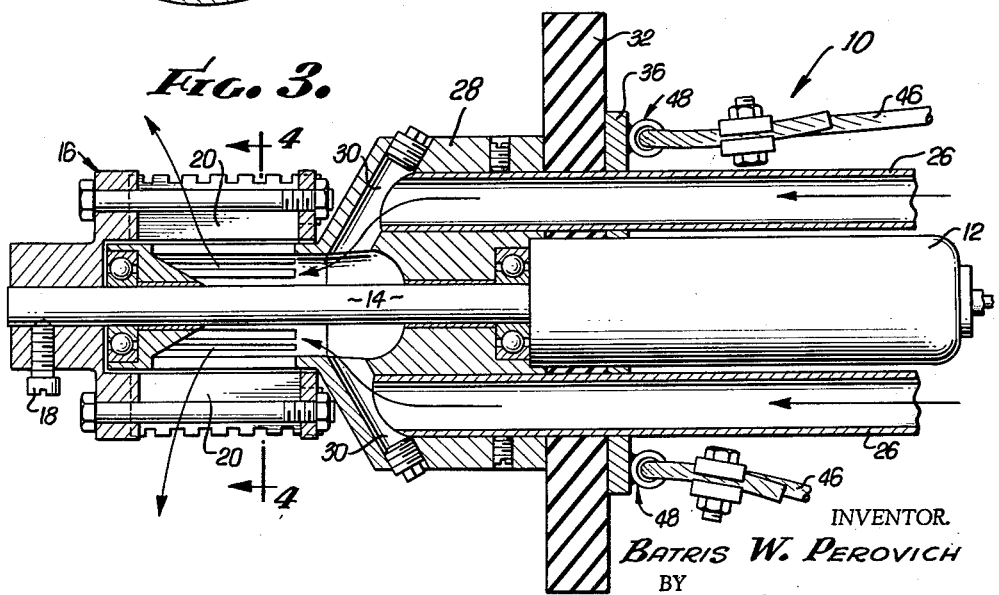
INVENTOR.
BATRIS W. PEROVICH
BY John Joseph Hall
ATTORNEY.

Dec. 8, 1964   B. W. PEROVICH   3,159,895
PIPE LINING MACHINE
Filed Feb. 5, 1962   2 Sheets-Sheet 2

INVENTOR.
BATRIS W. PEROVICH
BY
John Joseph Hall
ATTORNEY.

United States Patent Office 3,159,895
Patented Dec. 8, 1964

3,159,895
PIPE LINING MACHINE
Batris W. Perovich, 1660 S. Oak Knoll, San Marino, Calif.
Filed Feb. 5, 1962, Ser. No. 170,951
9 Claims. (Cl. 25—38)

This invention relates to improvements in pipe lining machines and particularly with reference to machines used for the lining of pipe interiors with mortar or other cementitious substances.

Convention pipe lining machines lack suitable means to maintain centeral location of the machine inside the pipe when lining pipe interiors. Further, no conventional pipe lining machines provide any means for cleaning the interior of the pipe being lined just before the mortar or other cementitious substance is deposited inside the pipe. Thus, conventional pipe lining machines often produce lining which is of an uneven thickness in cross section throughout the pipe and also contains imperfections due to material encrusted inside the pipe which has not been removed.

It is, therefore, an object of my invention to provide a pipe lining machine with centering means to maintain the machine in a central position inside the pipe being lined at all times.

Another object of my invention is to provide a pipe lining machine having means to produce a cleaning or squeegee action on the pipe interior just before the lining is deposited inside the pipe.

A further object of my invention is to provide a pipe lining machine with centering means capable of lining pipe having bends, valves, and other appurtenances with a uniform lining of mortar or other cementitious materials throughout the pipe interior.

These and other objects will be more readily understood by reference to the following specification, taken in conjunction with the accompanying drawings, in which FIGURE 1 is a side elevational view of the pipe lining machine inside the pipe being lined.

FIGURE 2 is a view taken on line 2—2 of FIGURE 1.

FIGURE 3 is a fragmentary longitudinal sectional view of the pipe lining machine.

FIGURE 4 is a view taken on line 4—4 of FIGURE 3.

Figure 5:
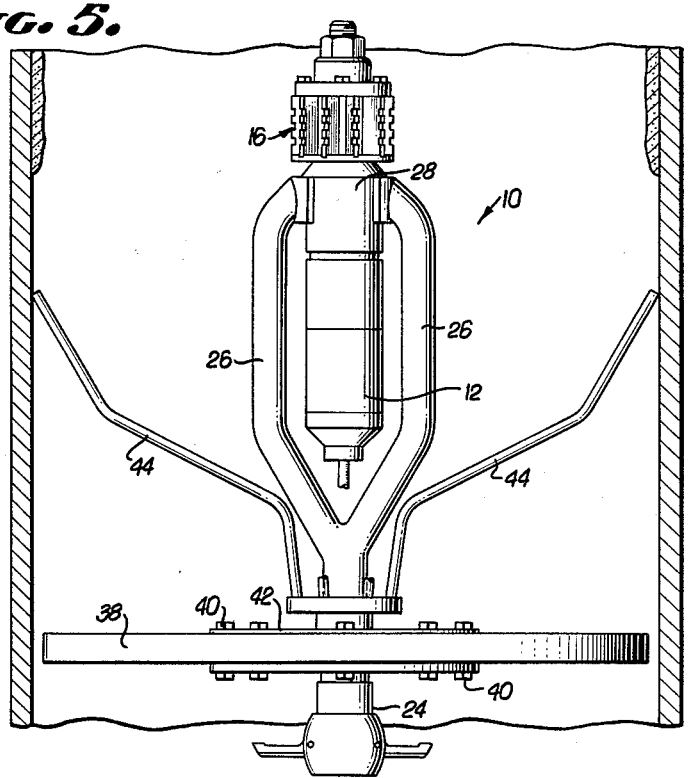
FIGURE 5 is a top plan view of the pipe lining machine.
Figure 6:
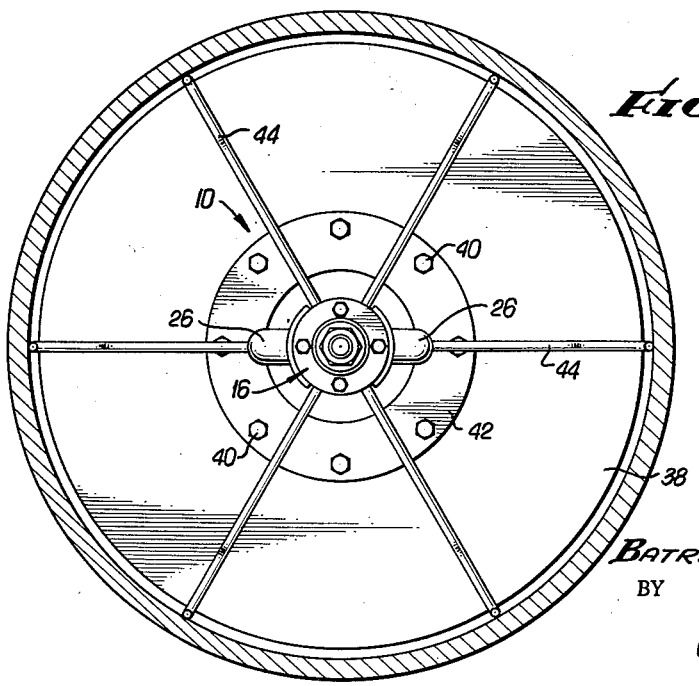
FIGURE 6 is a front elevational view of the pipe lining machine.

With reference to the construction of the pipe lining machine, which is indicated generally by the numeral 10, a motor, preferably an air motor, is enclosed in a housing 12 in the center of the pipe lining machine 10. A shaft 14 of the machine 10 is connected to the motor at one end and extends into the dispensing head 16. A set screw 18 secures the dispensing head 16 to the shaft 14. Slots 20 in the dispensing head 16 provide openings for the mortar or other cementitious material to be slung out of the dispensing head 16.

Mortar or other cementitious material is fed to the pipe lining machine 10 through a hose 22 connected to inlet 24 which leads to feeder tubes 26. The front ends of the feeder tubes 26 are connected to a boss 28 which has passageways 30 and slots 31 leading to the dispensing head 16.

In the embodiment of my invention illustrated in FIGURE 1 of the drawing, a rubber disc or squeegee 32 fits around the outside of the feeder tubes 26 and just behind the boss 28. The rubber disc 32 is fixed in position by bolts 34 securing it to a flange 36 connected to the boss 28. A second rubber disc or squeegee 38 fits around the inlet 24 and is fixed in position by bolts 40 securing it to a flange 42. In the embodiment of my invention illustrated in FIGURE 5 of the drawings, a guide spring 44 fits around the inlet 24 to keep the pipe lining machine centered. In this embodiment of my invention only one rubber disc 38 is needed in conjunction with the guide spring 44.

In the operation of my invention, the pipe lining machine 10 is pulled through the pipe interior by pull cables 46 anchored to the machine at 48. Mortar or other cementitious material is fed into the machine through the hose 22 and passes through the feeder tubes 26 into the dispensing head 16 and is slung out through slots 22 as the air motor 12 rotates the shaft 14 and thus the dispensing head 16. As the pipe lining machine is pulled thorugh the pipe it is maintained in a central position inside the pipe in one of two ways. In one way, the two rubber discs 32 and 38 illustrated in FIGURE 1 of the drawings maintains the pipe lining machine in a central position inside the pipe. In the second way, the rubber disc 38 and the guide spring 44 illustrated in FIGURE 5 also maintain the pipe lining machine in a central position inside the pipe.

When the pipe to be lined is essentially straight, the pipe lining machine having the two rubber discs is preferable. For pipe interiors having bends, valves, and other appurtenances, the pipe lining machine having the guide spring in one rubber disc is preferable since it has great maneuverability inside the pipe.

I have found that best results are obtained when the outer diameter of the rubber disc is about one half inch larger than the interior diameter of the pipe to be lined. Thus, for example, a pipe having an interior diameter of seven inches would receive a pipe lining machine with a rubber disc having an outside diameter of seven and one half inches to obtain the best results. However, my invention would work with a rubber disc having an outside diameter varying from seven inches to eight and one half inches for a pipe having an interior diameter of seven inches.

The amount of stiffness of the rubber discs may be varied by changing the diameter of the flange which secures them. For example, where a pipe having an interior diameter of seven inches is being lined, using a pipe line machine with a rubber disc having a diameter of seven and one half inches, the diameter of the flange securing the seven and one half inch disc may vary from five inches to six and seven eighths inches in diameter, depending upon the stiffness desired. The stiffness desired may vary depending upon the amount and type of encrusted material located on the pipe interior.

The effect of the rubber discs is twofold. First, the disc keeps the pipe lining machine in the center of the pipe, thus insuring an even distribution of the mortar or other cementitious material over the interior lining of the pipe. Second, the rubber disc produces a cleaning or squeegee effect on the interior walls of the pipe, thereby preparing the surface of the interior walls of the pipe for the depositing of the lining. Thus, when a pipe is lined using my invention, a more even and smoother lining is produced than by conventional pipe lining machines.

While I have described my invention in detail with reference to the accompanying drawings illustrating the preferred embodiments of my invention, it is understood that numerous changes in the details of the construction and arrangement of parts may be made without departing from the spirit and scope of the invention as hereinafter claimed.

I claim:

1. In a pipe lining machine of the type having a rotating dispensing head and a central housing containing a motor, the improvement for providing means for simultaneous centering of the machine and cleaning of the pipe immediately before being lined, said improvement comprising a pair of spaced flexible discs of variable flexibility mounted to flanges secured around the axis of the housing, the amount of flexibility of said discs varying inversely as the diameter of the flanges, and each of the said discs having a diameter ranging from a minimum diameter larger than the inside diameter of the pipe being lined and a maximum diameter about 20% larger than the pipe being lined.

2. In a pipe lining machine of the type having a rotating dispensing head and a central housing containing a motor, the improvement for providing means for simultaneous centering of the machine and cleaning of the pipe immediately before being lined, said improvement comprising a pair of spaced flexible discs of variable flexibility mounted to flanges secured around the axis of the housing, each of said discs having a diameter ranging from a minimum diameter larger than the inside diameter of the pipe being lined and a maximum diameter about 20% larger than the diameter of the pipe being lined.

3. In a pipe lining machine of the type having a rotating dispensing head and a central housing containing a motor, the improvement for providing means for simultaneous centering of the machine and cleaning of the pipe immediately before being lined, said improvement comprising a pair of spaced flexible discs of variable flexibility mounted to flanges secured around the axis of the housing, each of said discs having a diameter ranging from a minimum diameter larger than the inside diameter of the pipe being lined and a maximum diameter about 20% larger than the diameter of the pipe being lined, and means for varying the amount of flexibility of said discs.

4. In a pipe lining machine of the type having a rotating dispensing head and a central housing containing a motor, the improvement for providing means for simultaneous centering of the machine and cleaning of the pipe immediately before being lined, said improvement comprising in combination a flexible disc of variable flexibility mounted to a flange secured around the axis of the housing, and a flexible guide spring mounted on the housing and having a plurality of flexible fingers extending from the housing to the inside walls of the pipe being lined, and means for varying the amount of flexibility of said disc.

5. In a pipe lining machine of the type having a rotating dispensing head and a central housing containing a motor, the improvement for providing means for simultaneous centering of the machine and cleaning of the pipe immediately before being lined, said improvement comprising in combination a flexible disc of variable flexibility mounted to a flange secured around the axis of the housing, the amount of flexibility of said disc varying inversely as the diameter of the flange, and said discs having a diameter ranging from a minimum diameter larger than the inside diameter of the pipe being lined and a maximum diameter about 20% larger than the diameter of the pipe being lined, and a flexible guide spring mounted on the housing and having a plurality of flexible fingers extending radially from the housing to the inside walls of the pipe being lined.

6. In a pipe lining machine of the type having a rotating dispensing head and a central housing containing a motor, the improvement for providing means for simultaneous centering of the machine and cleaning of the pipe immediately before being lined, said improvement comprising a pair of spaced unitary flexible discs of variable flexibility mounted to flanges secured around the axis of the housing, each of said discs having a diameter of about ½ inch larger than the interior diameter of the pipe to be lined.

7. In a pipe lining machine of the type having a rotating dispensing head and a central housing containing a motor, the improvement for providing means for simultaneous centering of the machine and cleaning of the pipe immediately before being lined, said improvement comprising a pair of spaced unitary flexible discs of variable flexibility mounted to flanges secured around the axis of the housing, the amount of flexibility of said discs varying inversely as the diameter of the flanges, and each of said discs having a diameter about ½ inch larger than the interior diameter of the pipe being lined.

8. In a pipelining machine of the type having a rotating dispensing head and a central housing containing a motor, the improvement for providing means for simultaneous centering of the machine and cleaning of the pipe immediately before being lined, said improvement comprising a pair of spaced solid unitary flexible discs of variable flexibility disposed around the axis of the housing, each of said discs having a diameter of about ½ inch larger than the interior of the pipe being lined, and means mounting said discs in position and capable of varying the flexibility of said discs.

9. In a pipelining machine of the type having a rotating head and a central housing containing a motor, the improvement for providing means for simultaneous centering of the machine and cleaning of the pipe immediately before being lined, said improvement comprising in combination a solid unitary flexible disc of variable flexibility disposed around the axis of the housing, said disc having a diameter of about ½ inch larger than the interior diameter of the pipe being lined, means mounting said disc in position and capable of varying the flexibility of said disc, and a flexble guide spring mounted on the housing and having a plurality of flexible fingers extending radially from the housing to the inside walls of the pipe being lined.

References Cited in the file of this patent

UNITED STATES PATENTS

| 2,106,004 | Inglee | Jan. 18, 1938 |
| 2,293,365 | Scott | Aug. 18, 1942 |
| 2,427,632 | Stephens | Sept. 16, 1947 |
| 2,763,017 | Redin | Sept. 18, 1956 |
| 2,839,026 | Matheny | June 17, 1958 |
| 2,998,800 | Vernooy | Sept. 5, 1961 |
| 3,058,137 | Doyle et al. | Oct. 16, 1962 |

FOREIGN PATENTS

| 423,755 | Great Britain | Feb. 7, 1935 |
| 471,693 | Great Britain | Sept. 9, 1937 |
| 685,637 | Great Britain | Jan. 7, 1953 |